T. C. DUNCAN.
HARVESTING MACHINE.
APPLICATION FILED NOV. 4, 1915.
1,271,867.
Patented July 9, 1918.
8 SHEETS—SHEET 1.
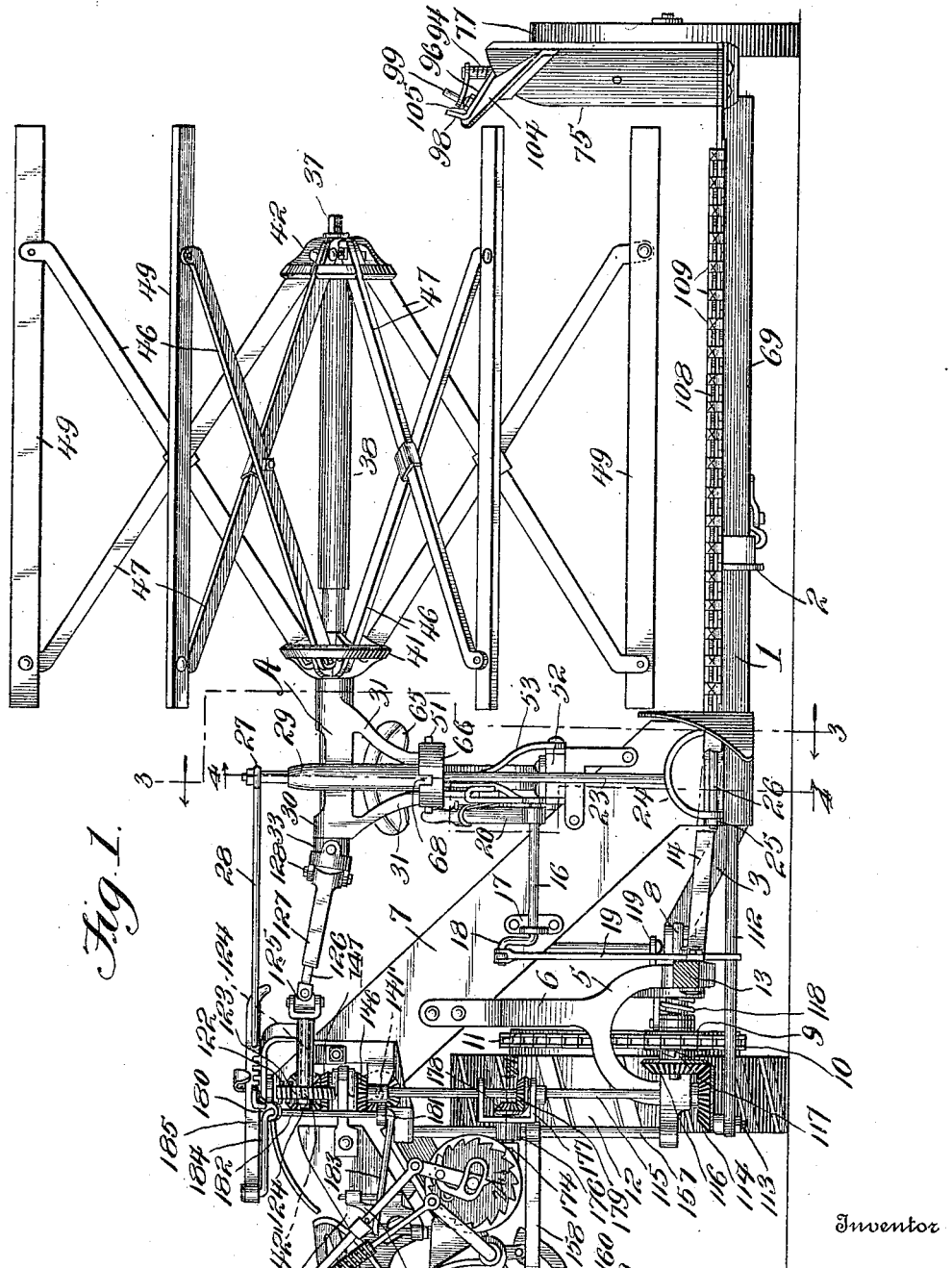

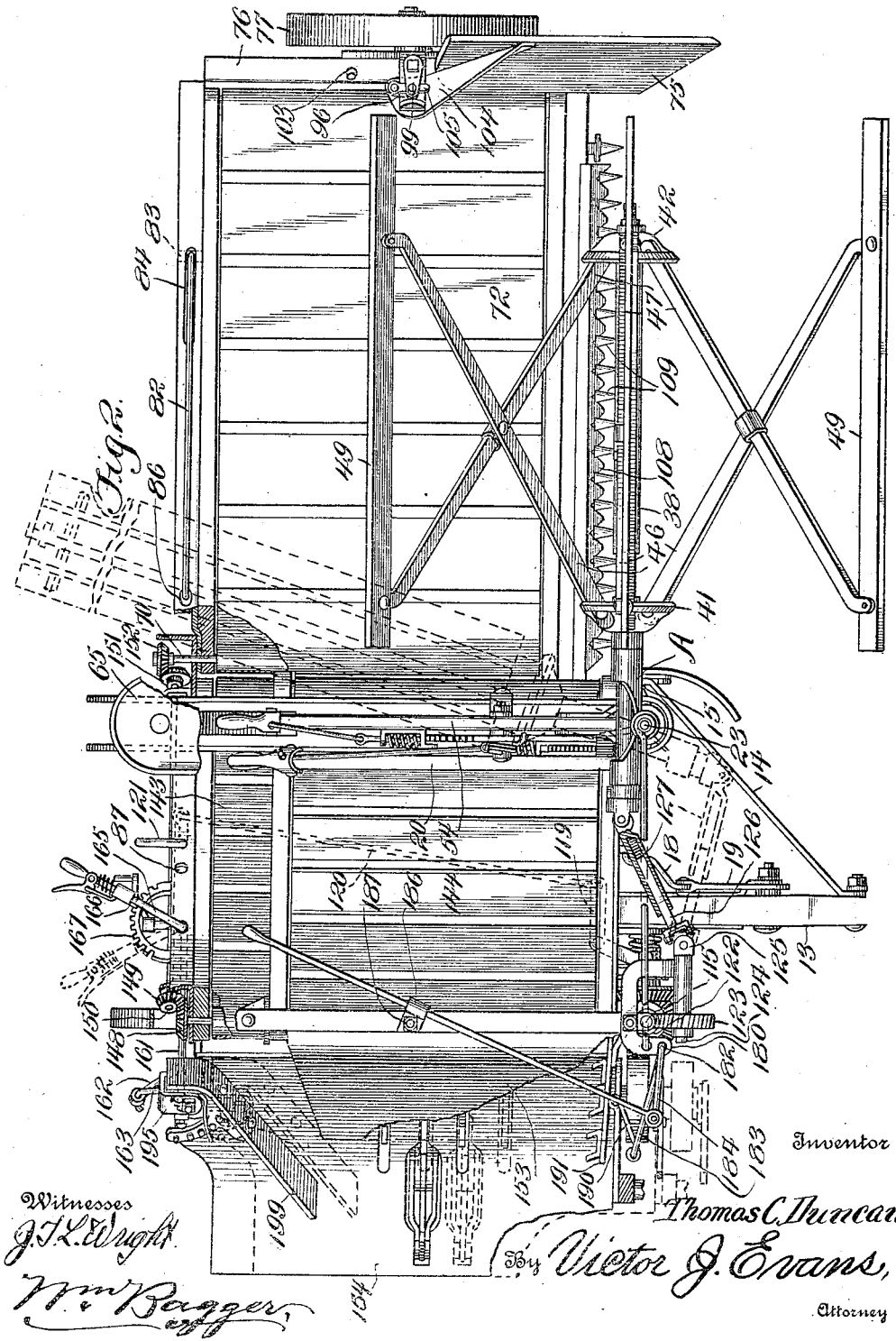

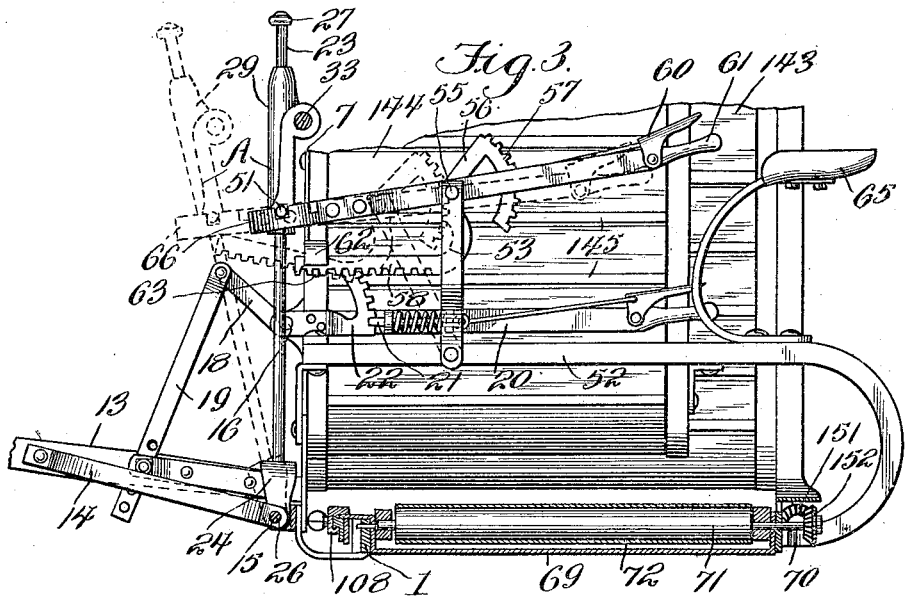
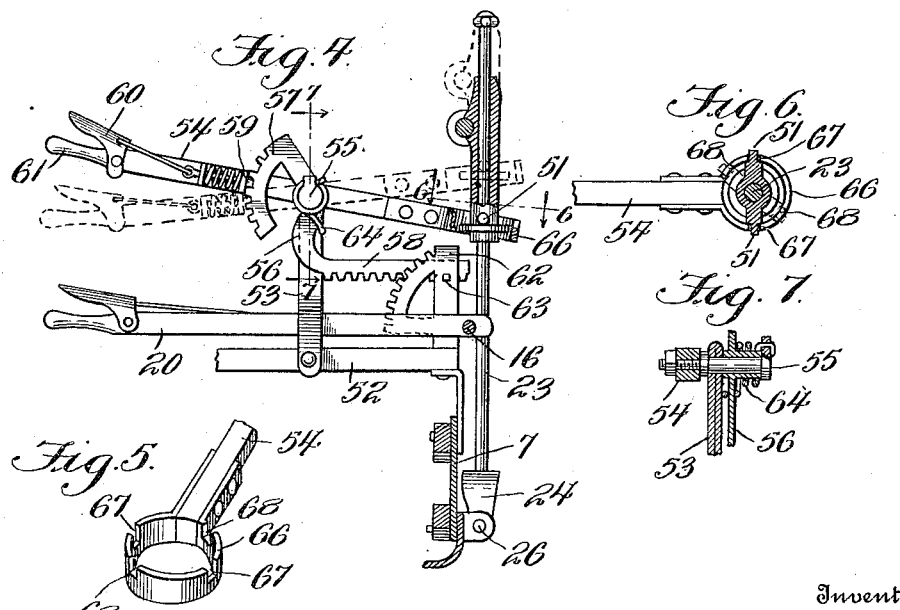

T. C. DUNCAN.
HARVESTING MACHINE.
APPLICATION FILED NOV. 4, 1915.
1,271,867.
Patented July 9, 1918.
8 SHEETS—SHEET 4.
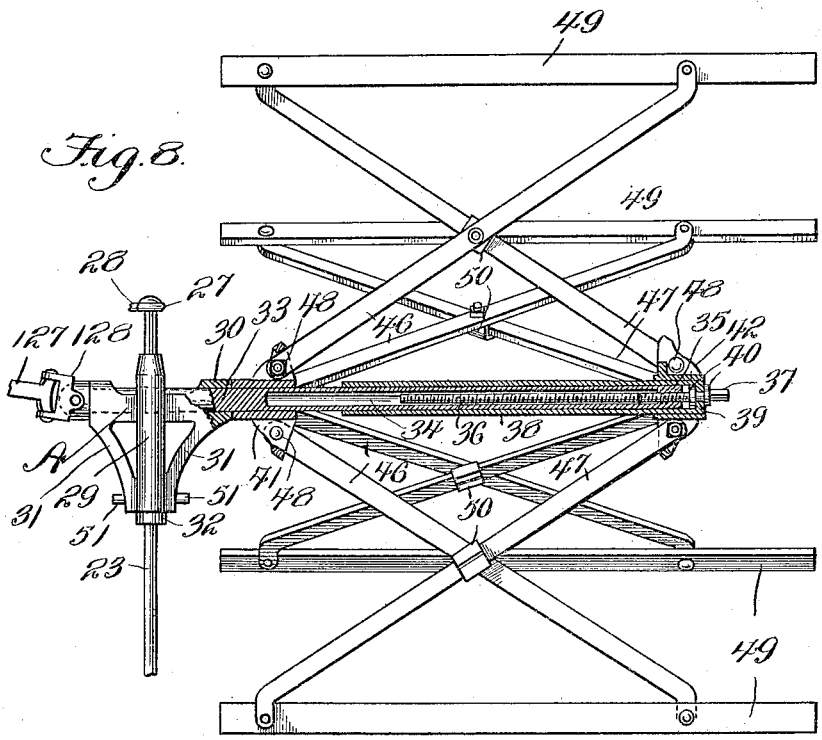
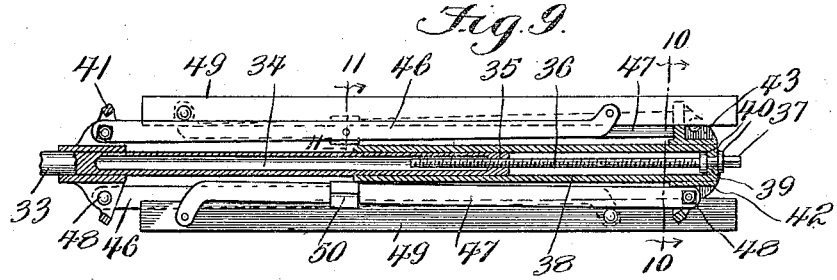
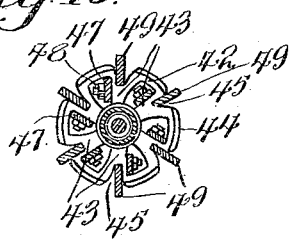
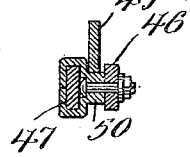
Witnesses
J. K. Wright
Wm Bagger
Inventor
Thomas C. Duncan,
By Victor J. Evans,
Attorney

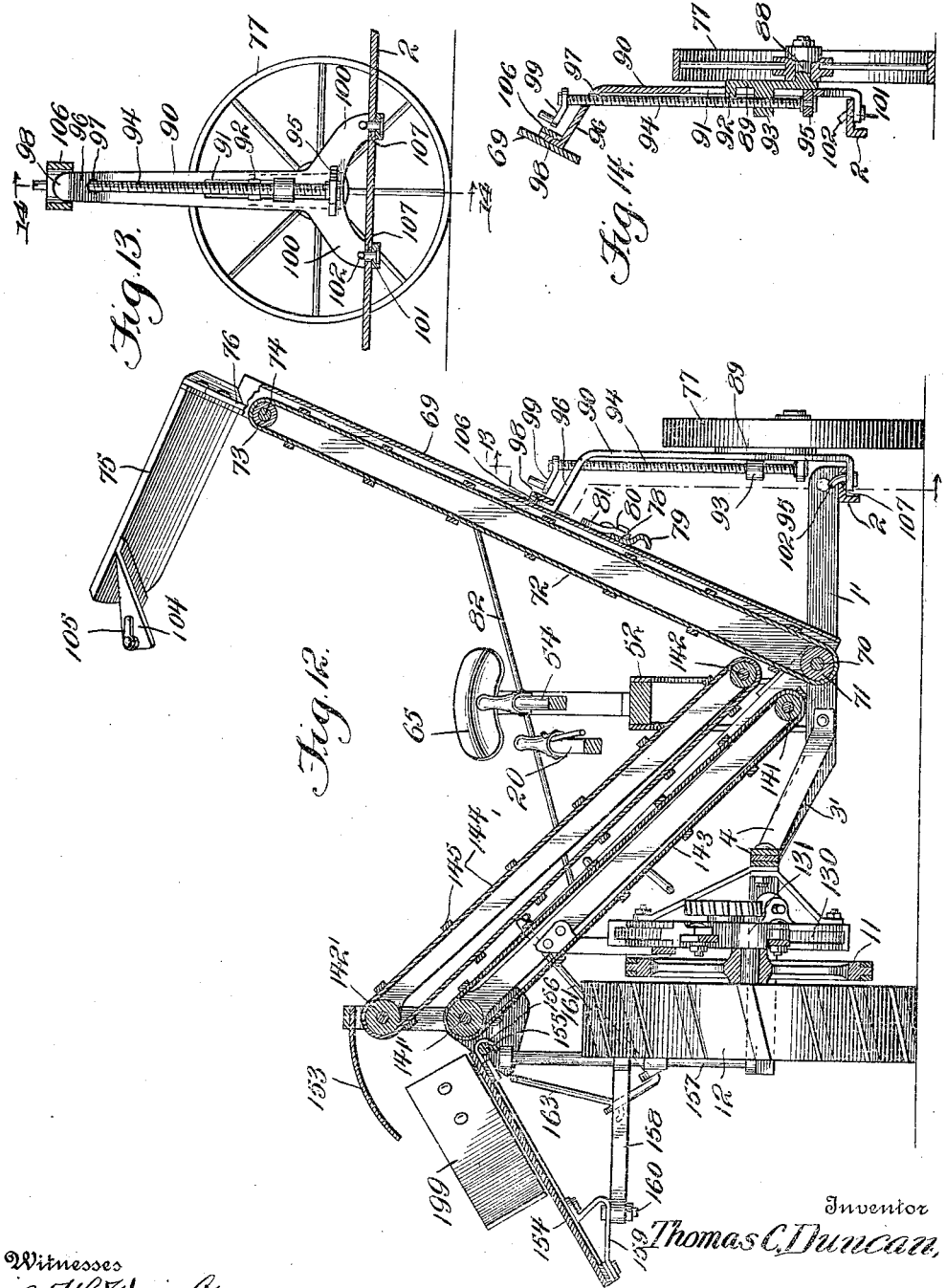

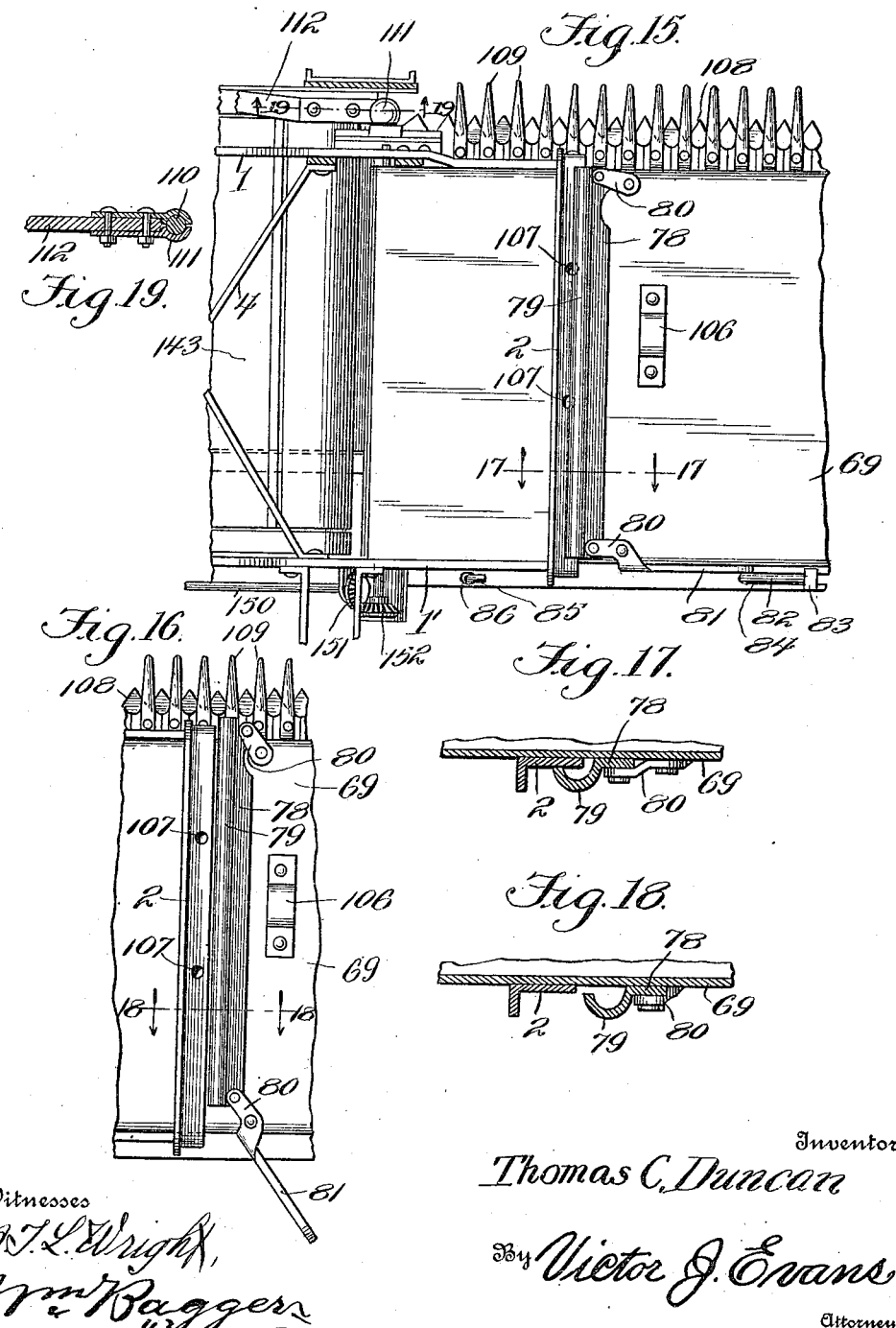

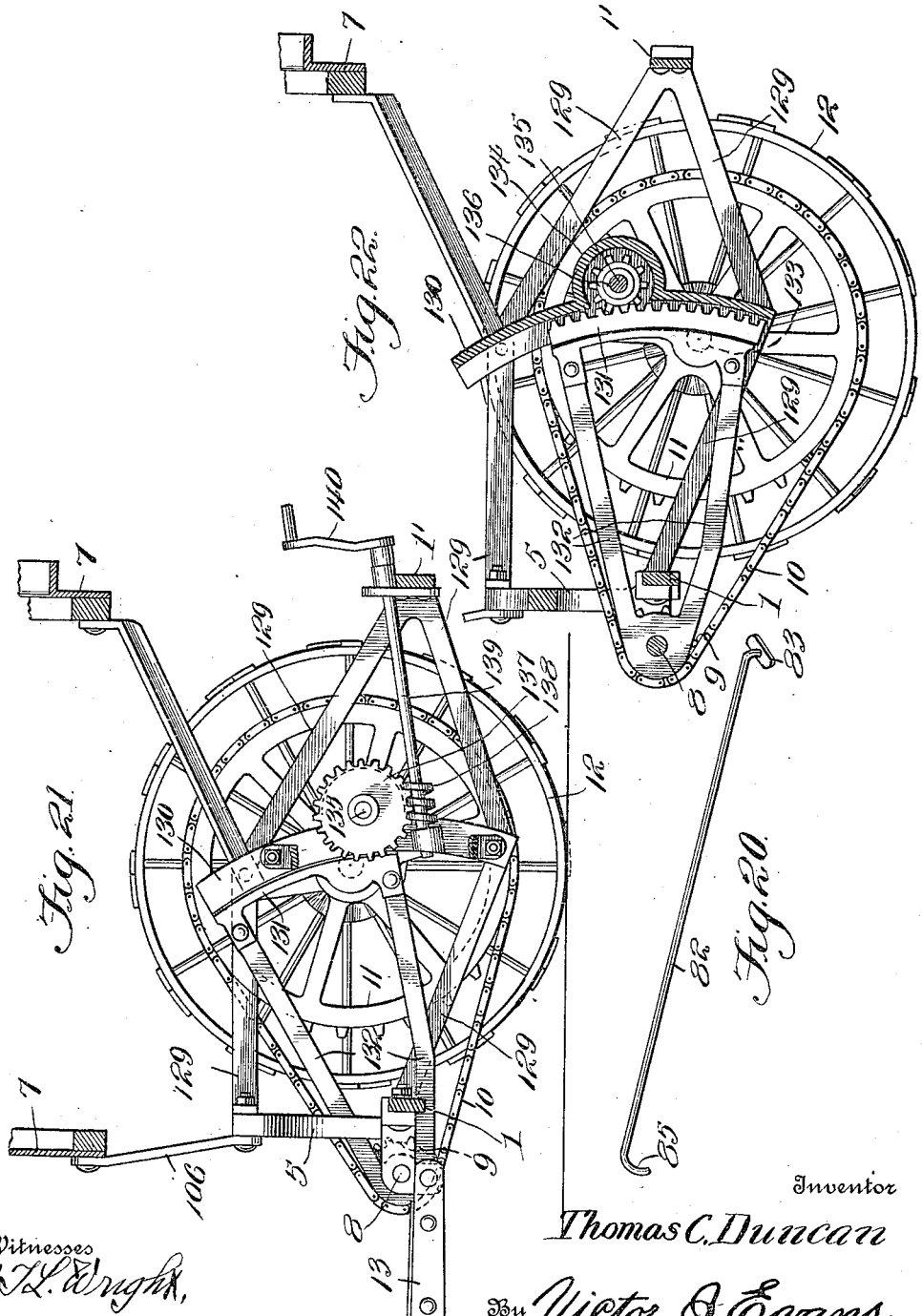

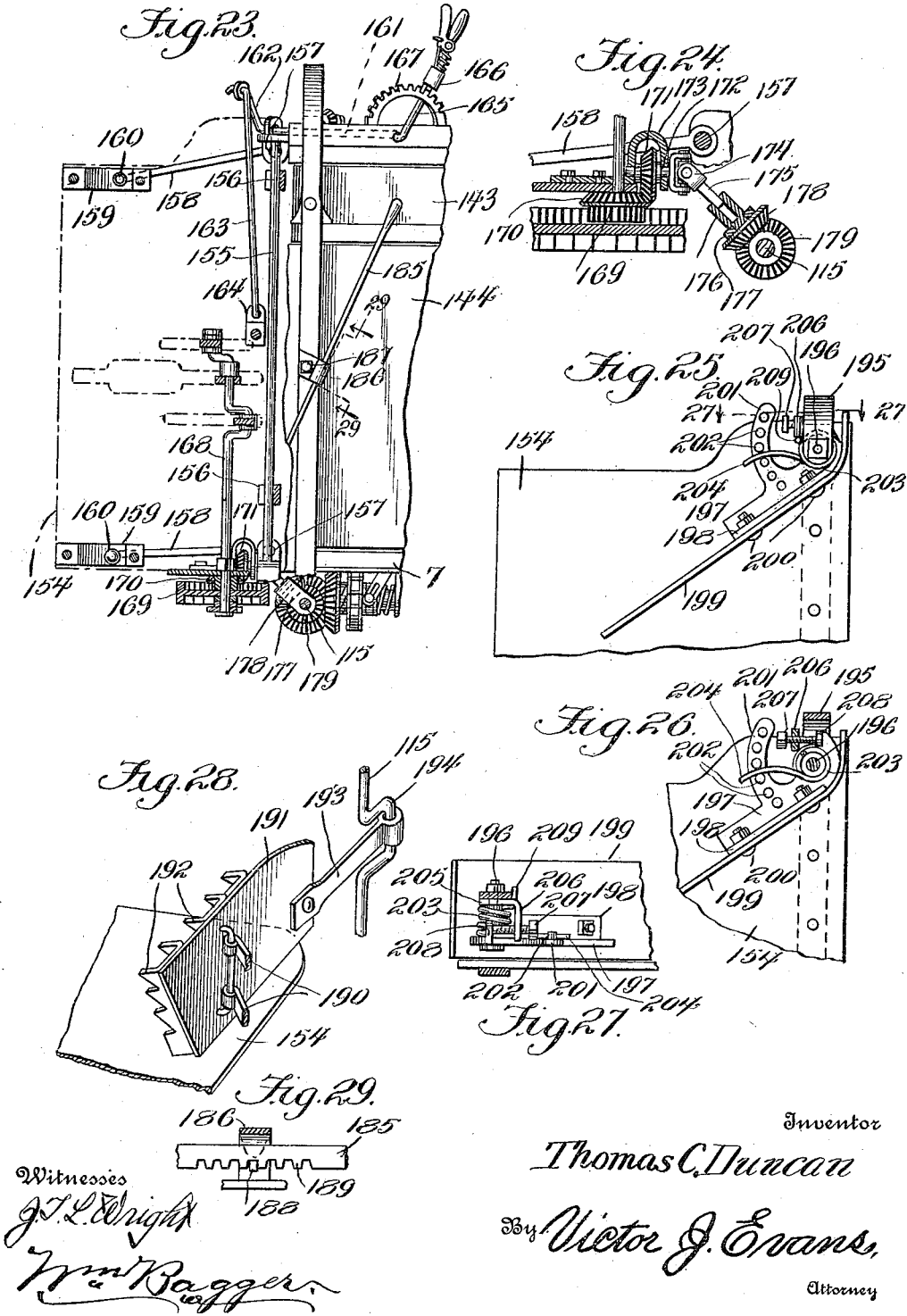

UNITED STATES PATENT OFFICE.

THOMAS C. DUNCAN, OF ST. JOSEPH, MISSOURI.

HARVESTING-MACHINE.

1,271,867.  Specification of Letters Patent.  Patented July 9, 1918.

Application filed November 4, 1915. Serial No. 59,649.

*To all whom it may concern:*

Be it known that I, THOMAS C. DUNCAN, a citizen of the United States, residing at St. Joseph, in the county of Buchanan and State of Missouri, have invented new and useful Improvements in Harvesting-Machines, of which the following is a specification.

This invention relates to harvesting machines generally and particularly to self binding grain harvesters.

One object of the invention is to produce a machine of the class described which shall be capable of being folded into relatively small compass so as to facilitate storage of the machine as well as transportation over ordinary roads and lanes and through ordinary gate openings which will not admit of the passage of the ordinary self binding harvester.

A further object of the invention is to simplify and improve the frame construction and the connection therewith of the grain platform, the latter being movably connected with the frame.

A still further object of the invention is to provide a grain wheel and supporting means for the same, said supporting means being adapted to connect the grain wheel with the machine whether the latter be extended for operation or folded for transportation.

A still further object of the invention is to simplify and improve the construction of the reel, said reel being foldable into a small compass and supported movably so as to be capable of being moved out of the way of the grain platform when the machine is folded for transportation.

A still further object of the invention is to simplify and improve the construction and operation of the means for supporting the reel in the position occupied thereby at various times.

A still further object of the invention is to simplify and improve the general construction of the operative parts of the machine and the actuating means therefor, to dispense to the greatest possible extent with driving means, such as chains, belts and the like and to simplify the general construction.

A still further object of the invention is to simplify and improve the means for adjusting the frame with reference to the bull wheel.

Still further objects of the invention are to simplify and improve the construction and operation of the grain conveying means, the binder table or platform and of the parts associated therewith.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a front elevation of a machine constructed in accordance with the invention.

Fig. 2 is a top plan view of the same.

Fig. 3 is a vertical sectional view taken on the line 3—3 in Fig. 1.

Fig. 4 is a vertical sectional view taken on the line 4—4 in Fig. 1.

Fig. 5 is a perspective detail view of the means for locking or retaining the reel in various positions.

Fig. 6 is a sectional detail view taken on the line 6—6 in Fig. 4.

Fig. 7 is a sectional detail view taken on the line 7—7 in Fig. 4.

Fig. 8 is a front elevation partly in section, showing the reel detached from the machine and extended for operation.

Fig. 9 is a sectional elevation showing the reel folded.

Fig. 10 is a sectional detail view taken on the line 10—10 in Fig. 9.

Fig. 11 is a sectional detail view taken on the line 11—11 in Fig. 9.

Fig. 12 is a sectional front elevation, showing the machine folded for transportation.

Fig. 13 is a detail side elevation of the grain wheel and the supporting means for the same.

Fig. 14 is a sectional detail view taken on the line 14—14 in Fig. 13.

Fig. 15 is a detail bottom plan view of the grain platform and adjacent parts of the frame of the machine.

Fig. 16 is a detail bottom plan view, showing a portion of the grain platform and related parts and showing the locking member disengaged to permit folding of the platform.

Fig. 17 is a sectional detail view taken on the line 17—17 in Fig. 15.

Fig. 18 is a sectional detail view taken on the line 18—18 in Fig. 16.

Fig. 19 is a sectional detail view taken on the line 19—19 in Fig. 15.

Fig. 20 is a detail view showing the adjustable brace member for sustaining the grain platform in folded position, detached.

Fig. 21 is a sectional side elevation showing the bull wheel, a portion of the frame and the means for effecting relative adjustment of the frame with reference to the bull wheel, the frame being shown in a lowered position.

Fig. 22 is a sectional detail view taken vertically through the arcuate member wherein the frame supporting the bull wheel is guided, and adjacent parts.

Fig. 23 is a detail top plan view of the portion of the machine adjacent to the binder deck, the latter being indicated in dotted lines only so as to expose the subjacent parts.

Fig. 24 is a sectional detail view, enlarged, taken on the line 24—24 in Fig. 1.

Fig. 25 is a detail plan view of the grain board and a portion of the binder deck supporting the same.

Fig. 26 is a sectional detail view taken horizontally through the grain board and the supporting means for the same.

Fig. 27 is a sectional detail view taken on the line 27—27 in Fig. 25.

Fig. 28 is a perspective detail view of the butter.

Fig. 29 is a sectional detail view taken on the line 29—29 in Fig. 23.

The main frame of the machine includes front and rear members 1 and 1' which are connected at one end by an angle bar 2, said front and rear bars being provided intermediate their ends with offsets 3, 3', whereby the grain side of the frame will be dropped below the discharge side. The frame is reinforced by brace members 4 to enable it to support the weight and strain of the parts and machine elements mounted thereon.

Suitably mounted upon the front bar 1 of the frame is an arch member 5 having an upwardly extending brace 6, the upper end of which is bolted upon the forward portion of the elevator frame 7, the lower end of which is supported upon the main frame. The arch member 5 is provided with boxes affording bearings for a shaft 8 having a sprocket wheel 9 which is driven by means of a chain or link belt 10 from a sprocket wheel 11 which is associated with the bull wheel or traction wheel 12 and from which the various moving parts of the machine are driven as will appear hereinafter.

The tongue 13 is hingedly mounted upon the shaft 8, and it has a hound member or brace 14 which is hingedly connected with the frame of the machine at 15, it being understood that the frame structure includes suitably arranged braces, bracket members and the like with which the various working parts may be connected in a convenient and suitable manner. A rock shaft 16 supported for oscillation in bearings, one of which, 17, is mounted upon the front portion of the elevator frame, said rock shaft is provided at one end with an arm 18 which is connected with the tongue by means of a link 19. Said rock shaft is also provided with a lever 20 having a stop member 21 adapted to engage a segment rack 22 which is securely mounted upon the frame of the machine. It is evident that by manipulating the lever 20 the frame of the machine and the tongue may be relatively tilted as is customary in this class of machines for the purpose of presenting the cutting apparatus to the grain at the proper angle and at the desired distance above the ground.

23 is an upright shaft or member having at its lower end a fork 24 which is hingedly connected with ears or lugs 25 upon the front bar of the frame by means of a rod or bolt 26 which latter may also constitute the pivotal member for the hound member 14. The upper end of the shaft or upright 23 is journaled in an eye 27 at one end of a brace member 28, the opposite end of which is pivotally connected with a stationary portion of the frame of the machine. The brace 28 serves to support the upright 23 against lateral movement without preventing the upper end of said upright from being tilted longitudinally of the frame of the machine. The upright 23 supports a bearing member A including a vertical sleeve 29 which slidably engages the upright 23, a transverse or approximately horizontal sleeve 30 and braces or strengthening members 31, the several parts being preferably composed of a single casting which is vertically adjustable upon the upright 23 between the eye 27 and the brace 28 and a collar or stop member 32, said eye and stop member serving to limit the movement of the casting or bearing member A in an upward and downward direction, respectively.

Supported for rotation in the sleeve 30 of the bearing member or casting A is the reel carrying shaft 33 which has a tubular portion forming a longitudinal socket 34 having a threaded portion forming a nut 35 that is engaged by a longitudinally movable screw threaded stem or bolt 36 having at its outer end a wrench seat 37 which is adapted to be engaged by a suitable wrench or tool whereby it may be rotated. A sleeve 38 which is mounted upon and adapted to move longitudinally of the shaft 33 is provided at its outer end with a flange 39 engaging the screw threaded stem 36 which latter is provided with collars 40 between which the flange 39 operates, thus establishing a swivel connection between the sleeve 38 and the screw threaded rod 36, whereby, by the rotation of said rod, the sleeve 38 will be moved longitudinally of the shaft 33.

Securely mounted upon the shaft 33 adjacent to the bearing member or sleeve 30 is a cap 41, and a similar cap 42 is securely mounted upon the sleeve 38 adjacent to the outer end of the latter. The caps 41, 42 are each provided with radial arms 43 and with a circumferential annular rim 44, the rim 44 of the cap 42 being in addition provided with notches 45 adjacent to the arms 43. Ribs or brace members 46, 47 are pivotally connected with the radial arms 43 of the caps 41 and 42, respectively, by pivotal members such as bolts 48. The opposite or outer ends of the ribs or braces 46 and 47 are pivotally connected with the reel bars 49, which latter are adapted to be sustained in approximate parallel relation to the axis of the shaft 33. Pivotally connected with each of the ribs or brace members 46 is a clip or keeper 50 encircling and slidably engaging the mating rib or brace member 47 which is pivotally connected with the cap 42.

It will be seen from the foregoing, and particularly by reference to Figs. 8, 9, 10 and 11 of the drawings, that the brace members 46, 47 constitute toggles, whereby the reel bars 49 are movably connected with the caps 41, 42. By moving the cap 42 in the direction of the cap 41 it is evident that the toggle bars 46, 47 will be actuated to move the reel bars outwardly from the axis of the supporting shaft which is composed of the member 33 and the longitudinally slidable sleeve 38 which respectively supports the caps 41, 42. By moving the cap 42 outwardly from the cap 41, the toggle members will be actuated to collapse the reel, moving the reel bars 39 inwardly in the direction of the axis of the supporting shaft to the position indicated in Fig. 9 of the drawings. When the reel is thus collapsed or folded, the reel arms will engage the notches 45 in the rim 44 of the cap 42, said notches being provided in order to enable the reel bars to be moved inwardly until the reel is collapsed so as to occupy the smallest possible space. It is obvious that the adjustment in either direction is effected simply by rotating the screw threaded rod or bolt 36 by means of a wrench or suitable tool applied to the seat 37. It is also evident that the reel will be sustained by said screw either in an extended or a collapsed or in any intermediate position to which it may be adjusted. This is regarded as an important and valuable feature of the device, because the diameter of the reel may thus be varied according to the height of the grain that is to be operated upon and other incidental conditions, the reel being firmly maintained so as to be successfully operative at any adjustment.

In addition to being collapsible and expansible, as described, the reel is capable of being vertically adjusted upon the upright 23, and the reel carrying shaft is, furthermore, capable of swinging about the axis of said upright, which latter constitutes a shaft engaging the vertical sleeve 29 of the bearing member A. Said bearing member is provided adjacent to its lower end with laterally extending pins 51 which are preferably diametrically opposed, as will be clearly seen in Fig. 8.

Pivotally associated with a frame member 52 of the machine, as best seen in Figs. 3 and 4, is an arm or bracket 53 upon which a lever 54 is fulcrumed. The pin or bolt 55 upon which the lever 54 is pivoted also supports a pivoted member 56 which includes a segment rack 57 and a straight rack bar 58. The segment rack 57 is engaged by a spring-actuated stop member 59 carried by the lever and actuated in the customary manner by means of a bell crank 60 that is fulcrumed adjacent to the handle 61 of the lever 54. The straight rack bar 58 engages a keeper 62 which is associated with the frame of the machine, said keeper having a transversely disposed pin 63 adapted to be engaged by the teeth of the rack bar. A suitably arranged spring 64 is provided to press against the pivoted member 56 which is thereby actuated to move the rack bar 58 in a downward direction to normally engage the pin 63, thereby sustaining the pivoted arm or bracket 53 in adjusted position. The arm of the lever 54 having the handle 61 extends rearwardly within convenient reach of the operator for whom a seat 65 is provided. The forwardly extending arm of the lever 54 carries an annular ring or band 66 encircling the upright 23 and adapted to engage and support the lower end of the reel carrying member A. The annular band 66 is provided with diametrically opposite notches 67 to engage the pins 51 upon the member A for the purpose of maintaining said member in position with the reel carrying shaft disposed transversely of the machine, in proper position for operation, and said ring is provided with additional diametrically opposite notches 68 adapted to engage the pins 51 when the reel after being folded is swung or moved rearwardly to a position indicated in dotted lines in Fig. 2 for the purpose of enabling the grain platform of the machine to be folded for transportation, as indicated in Fig. 12.

It will be understood that by rocking the lever 54 upon its fulcrum, the reel carrying member A may be raised or lowered, said member being supported in adjusted position by the stop member 59 engaging the segment rack 57. By bearing downward upon the handle 61 of the lever while the stop member is thus engaged, the member 56 may be tilted against the tension of the spring 64 to disengage the rack 58 from the pin 63, and by pushing or pulling the lever 54 in the proper direction the arm or bracket 53 may now be tilted, causing the shaft or upright 23 which supports the reel carrying member A to be likewise tilted forwardly or rearwardly, as may be desired, a forwardly tilted position being indicated in dotted lines in Fig. 3. By releasing the downward pressure upon the handle 61 of the lever 54 which still remains in locked engagement with the rack segment 57, the member 56 will now be restored by the tension of the spring 64 to place the rack 58 in engagement with the pin 63, thereby retaining the parts in adjusted position. It will be seen that by the simple means just described provision is made for raising and lowering the reel, as well as for moving it bodily in a forward or rearward direction to the position that shall be best suited for the particular condition of the grain that is to be operated upon by the machine.

It will be evident that the forward end of the lever 54 may be tilted in a downward direction sufficiently to disengage the notches 67 and 68 in the band 66 from the pins 51 of the member A, while the latter is supported upon the collar 32, thus enabling the reel carrying member A to be conveniently turned or swung to the desired position, after which by proper manipulation of the lever, the pins 51 may be again placed in engagement with the notches 67 or 68, as may be required.

The grain platform 69 is hingedly connected with the front and rear frame bars of the machine by means of a shaft 70 which carries one of the supporting rolls 71 of the endless conveyer 72, the other supporting roll 73 being mounted upon a shaft 74 adjacent to the outer end of the grain platform. The latter is equipped with the customary grain guide 75, and it has at its outer extremity a flange 76 with which the grain wheel 77 may be detachably connected by means which will be presently described. The grain platform may be described as consisting of a pan or casing, the bottom of which, when the machine is in position for operating, is supported upon the angle bar 2 of the frame. The grain platform is provided upon its underside with a locking member consisting of a bar 78 having a transversely curved or hook-shaped portion 79, said bar being movably supported by means of a pair of links 80, one of which is extended so as to form an arm or handle 81, whereby it may be actuated for the purpose of moving the locking bar longitudinally and transversely with reference to the platform, thus placing the hook-shaped portion of said locking bar into or out of engagement with the angle bar 2 of the frame, as will be clearly seen in Figs. 15, 17 and in Figs. 16, 18, respectively, of the drawings. It is obvious that when the locking bar engages the angle bar 2, as seen in Figs. 15 and 17, the grain platform will be firmly connected with the frame of the machine in position for operation. By disengaging the locking bar from the angle bar 2, the grain platform may be tilted upward to the position indicated in Fig. 12 of the drawings.

A brace rod is provided for the purpose of supporting the grain platform in its upwardly tilted position, said brace rod, which is shown at 82, and a perspective view of which appears in Fig. 20 of the drawings, is provided with a T head 83 which slidably engages a slot 84 in the rear edge of the grain platform. The opposite end of the brace rod 82 is formed with a hook 85 which when the machine is in position for operation may be placed idly in engagement with an aperture 86 in the rear edge of the grain platform. When the latter is tilted to the position shown in Fig. 12 for the purpose of transporting the machine, the hook 85 may be placed in engagement with an aperture 87 in the frame of the machine, said aperture appearing clearly in Fig. 2 of the drawings.

The grain wheel 77 is supported for rotation upon a spindle 88 extending from a slide 89 which is movably associated with a supporting member consisting of a plate 90 having a vertical slot 91 engaged by a guide member 92 extending from the slide. Said slide is also provided with a nut 93 extending through the slot 91 and engaged by a screw 94, the lower end of which is swiveled in a flange 95 upon the plate or supporting member 90. The latter is bent at its upper end to form a laterally extending flange 96 having an aperture 97 through which the screw 94 is guided, said flange being also provided with a terminal hook 98. The screw 94 is provided with a crank 99, whereby it may be rotated about its axis for the purpose of effecting vertical adjustment of the slide 89 carrying the grain wheel, the adjustment being obviously effected by the engagement of the screw 94 with the nut 93, and it being also evident that the grain wheel will be safely retained at the proper adjustment. The lower extremity of the plate or supporting member 90 is bifurcated to form arms 100 each having at its lower end a laterally extending flange 101 provided with an upstanding hook member 102.

The flange 76 at the outer end of the grain platform is provided with apertures 103 for the passage of the hooks 102 upon the flanges 101 at the extremities of the arms 100 of the plate or supporting member 90. When the parts are thus assembled, as indicated in Fig. 2, the outer end of the platform will be supported upon the flanges 101, and the plate or supporting member 90 will extend upwardly adjacent to the rear end of the grain guide, which latter is equipped with a wing or flange 104 to support the laterally extending flange 96 at the upper end of the plate 90. Said wing 104 is also provided with a fastening member, such as a turn button 105, which may be placed in engagement with the flange 96 for the purpose of maintaining the parts in assembled relation, as best seen in Figs. 1 and 2.

The grain platform is provided upon its underside with a keeper 106. When said grain platform is to be tilted to the position shown in Fig. 12, the grain wheel is first detached, and the rod or brace member 82 is now brought into requisition, the hook 85 at one end of said rod being placed in engagement with the aperture 87 to assist in supporting the grain platform in the up-tilted position. The hook members 102 of the grain wheel supporting member are now placed in engagement with apertures 107 in the angle bar 2 of the frame, and the upturned hook 98 at the end of the flange 96 is now placed in engagement with the keeper 106, as clearly seen in Figs. 12, 13 and 14, the parts being retained in assembled position by the weight of the grain platform. It is obvious that at all times the position of the grain wheel relatively to the plate or supporting member 90 may be adjusted by turning the screw 94, thereby raising or lowering the side of the machine which is directly supported upon the grain wheel.

It may be stated that when the grain platform is to be up-tilted or restored to its operative position, the frame of the machine may be temporarily supported by means of jacks or supporting means of any suitable character which will enable the desired adjustment to be made without permitting the frame to sag to the ground.

The cutting apparatus of the machine includes a cutter bar 108 of conventional construction, the same being supported for reciprocation adjacent to the front edge of the grain platform which is equipped with guard fingers 109. The cutter bar is provided adjacent to one end with a ball 110 engaging a socket 111 which is connected with one end of a pitman 112, the opposite end of which is pivoted upon a wrist pin 113 extending downwardly from a bevel gear 114 upon the lower end of a vertically disposed shaft 115 which is supported for rotation in suitable bearings upon the frame of the machine and which is driven by a bevel gear 116 upon the shaft 8, which latter is driven directly from the bull wheel of the machine. The bevel gear 116 is fixed upon the shaft 8 for rotation therewith by means including a clutch 117 actuated by a spring 118 and capable of being thrown out of gear by means including a shipping lever 119, a connecting rod 120 and a hand lever 121, which latter is disposed in juxtaposition to the driver's seat 65.

The shaft 115 carries adjacent to its upper end a worm 122 meshing with a worm gear 123 upon one end of a shaft 124, the other end of which is connected by a universal joint 125 with a non-circular shaft 126. The latter slidably engages a tubular shaft 127 which is connected by a universal joint 128 with the reel carrying shaft 33 to which motion will thus be transmitted from the vertical shaft 115. It will be readily understood that owing to the presence of the universal joints 125 and 128 and to the extensible shaft composed of the members 126 and 127 motion may be transmitted to the reel carrying shaft in any position occupied by the latter.

The frame of the machine includes truss members 129 supporting an arcuate guide 130 wherein is guided an arcuate rack 131 carried by a frame 132 which is pivotally supported upon the shaft 8 with reference to which the rack 131 is concentric. The frame 132 carries the spindle 133 upon which the bull wheel 12 is journaled. The arcuate guide 130 has associated therewith a casing 134 affording a bearing for a shaft 135 carrying a pinion 136 that meshes with the arcuate rack 131. The shaft 135 also carries externally of the casing 134 a worm gear 137 meshing with a worm 138 upon a shaft 139 having a crank 140 whereby it may be rotated, said shaft being supported in suitable bearings upon the frame of the machine of which the guide 130 may be regarded as constituting a part. It will be seen that by rotating the worm carrying shaft 139 the shaft 135 carrying the pinion 136 will be rotated, said pinion being in mesh with the arcuate rack 131 upon the frame 132 which carries the spindle upon which the bull wheel is journaled. Consequently, by such operation, the frame of the machine will be raised or lowered relatively to the bull wheel, according to the direction in which the shaft 139 is rotated, such adjustment being effected without interfering with the operation of the moving parts of the machine.

The elevator frame, which has been designated by the numeral 7, is provided with bearings in which shafts 141, 141' and 142, 142' are supported for rotation, the shafts 141, 142 being adjacent to the lower end of the elevator frame, and the shafts 141', 142' being adjacent to the upper end of the elevator frame, while the shafts 142, 142' are disposed above the planes in which the shafts 141, 141' are located. The shafts 141, 141' carry rollers over which an endless conveyer 143 is guided, and the shafts 142, 142' in like manner serve to support an endless conveyer 144, the opposed leads of the two conveyers serving to carry between them the grain coming from the endless conveyer 72 upon the grain platform. The several conveyers may or may not be equipped with crossed slats, some of which have been indicated at 145 for the purpose of engaging the grain that is to be carried to the binding mechanism. The shafts 141', 142' are driven by bevel gearing 146, 147 from the shaft 115, and the shaft 141' is provided at its rear end with a bevel pinion 148 meshing with a bevel pinion 149 at the upper end of an inclined shaft 150 supported in bearings upon the rear of the conveyer frame, said shaft 150 being provided at its lower end with a bevel pinion 151 meshing with a bevel pinion 152 upon the rear end of the supporting shaft 70 of the conveyer 72 that operates upon the grain platform and to which motion is in this manner transmitted.

Associated with the upper end of the conveyer frame 7 is a shield or deflector 153 beneath which the grain is discharged by the conveyers 143, 144 upon the binder deck 154. The binder deck is slidably supported upon a shaft 155 which is engaged by hook members 156 at the upper edge of the binder deck. A pair of vertically disposed rock shafts 157 are provided with radially extending arms 158 with which brackets 159 upon the underside of the binder deck and adjacent to the lower or discharge edge of the latter are pivotally associated by means of pins or bolts 160. A rock shaft 161 journaled in suitable bearings upon the rear part of the frame of the machine is provided with a radially extending arm 162 which is connected by a link 163 with a lug 164 upon the underside of the binder deck. The rock shaft 161 is also provided with an operating arm or lever 165 having a spring actuated stop member 166 adapted to engage an arcuate rack 167 upon the frame of the machine. It will be seen that by this mechanism the binder deck may, by manipulating the lever 165, be moved longitudinally of the supporting shaft 155 and that it is capable of being securely retained in adjusted position. This provision is made in order to adapt the machine to operate upon grain straws of varying lengths.

Supported for rotation in bearings upon the underside of the binder deck is the packer shaft 168 carrying the wheel or casing 169 from which motion is transmitted in the usual manner to the binding mechanism. The packer shaft receives motion from the shaft 115 by means including a bevel gear 170 upon the packer shaft, the same meshing with a bevel gear 171 upon a shaft 172 which is supported for rotation in a bracket 173. The shaft 172 is connected by a universal joint 174 with a non-circular shaft 175 engaging a tubular shaft 176 which is supported for rotation in a yoke 177 which is loosely supported upon the shaft 115, said tubular shaft 176 being provided with a bevel pinion 178 meshing with a bevel pinion 179 upon the shaft 115, thereby transmitting motion to the packer shaft and to the parts associated therewith.

Supported for oscillation in lugs or brackets 180, 181 upon the frame of the machine is a rock shaft 182 having radially extending arms 183, 184, the latter of which is pivotally connected with an operating rod 185 which is guided through a keeper 186 which is mounted by a pivot 187 upon the frame of the machine, said keeper being provided with a transverse pin 188 adapted to engage rack teeth 189 formed upon the lower edge of the operating rod 185, as will be best seen in Fig. 29 of the drawings. It will be observed that by disengaging the rack teeth 189 from the pin 188 the operating rod 185 may be moved longitudinally to effect oscillation of the rock shaft 182, the rear end of said operating rod being extended within convenient reach of the driver or operator. The arm 183 of the rock shaft is connected by a link or links 190 with the butter 191 which is provided with toothed flanges 192 to engage the butt ends of the grain, said butter being provided with an arm 193 that is journaled upon a crank 194 of the upright shaft 115. It will be seen that by manipulating the adjusting rod 185, the butter may be moved forwardly or rearwardly to the position which it is designed to occupy with reference to the binder deck, and it will be further seen that when the machine is in operation the butter will be vibrated by the action of the shaft 115, the inward movement serving to throw the heel of the butter in a forward direction, while upon the outward movement the heel of the butter is moved rearwardly, while the entire butter member is moved in an outward direction, thus exercising the proper pushing action upon the butt ends of the straws.

The binder deck 154 is provided adjacent to its upper rear corner with a yoke-shaped bracket 195 affording bearings for a shaft 196 upon which a supporting member 197 is pivotally mounted, said supporting member being provided with a flange 198 upon which a grain board 199 adapted to engage the heads of the grain is secured by means such as bolts 200. The supporting member 197 has a rearwardly extending arcuate arm 201 provided with a series of spaced upstanding pins 202. Coiled about the pin or shaft 196 is a spring 203, one terminal arm, 204, of which may be disposed between any two of the upstanding pins 202. Pivotally supported upon the pin 196 is a plate 205, as will be best seen in Fig. 27 of the drawings, said plate being provided with a downturned flange 206 with which a set screw 207 has threaded engagement, the point of said set screw being disposed in the path of an upturned flange 208 of the supporting member 197. The upper terminal 209 of the spring 203 abuts upon the screw carrying flange 206 of the plate 205. It will be seen that the tension of the spring 203, which may be regulated by the adjustment of the arm 204 with reference to the pins 202 will serve to move the board 199 in the direction of the heads of the grain that is being operated upon, and that the swinging movement of the grain board 199 in the direction of the heads of the grain may be limited and regulated by proper adjustment of the set screw 207 which engages the flange 208 of the supporting member 197.

The grain binding mechanism proper may be of any suitable and approved construction, although it may be stated that I have devised an improved grain binding mechanism which will be made the subject of a separate application for Letters Patent.

From the foregoing description, taken in connection with the drawings hereto annexed, the operation and advantages of the improved machine will be readily understood by those skilled in the art to which it appertains. It will be seen that the general construction of the machine is extremely simple and that the means for transmitting motion to the various working parts of the machine in particular have been simplified by the omission of many of the transmission elements which it is usually considered necessary to employ in machines of this description. The machine, by swinging the reel after collapsing the same, in a rearward direction may be folded into small compass by up-tilting the grain platform, and the machine may thus be reduced to a total width which will permit its being conveniently transported over narrow roads and bridges and through gate openings of ordinary width. I thus not only dispense with the binder truck which is usually employed in connection with machines of this class when they are to be transported from one place to another, but I also provide a machine which may be stored and housed in less space than the ordinary grain binding harvester. The operation of up-tilting the grain platform may be easily and expeditiously performed, the labor of one man only being required, while the use of a binder truck requires the labor of at least two men to load the machine. In spite of its many advantages it is possible to construct the improved machine at a cost which slightly exceeds that of the ordinary non-folding machine and possibly even at a less expense and certainly at an expense which is less than that of the ordinary grain binding harvester, together with the truck which is almost indispensable in connection therewith. The simplicity of construction insures efficiency in operation, and owing to the reduction of the number of parts involved in the construction, danger of breakage is much reduced, and necessary repairs may be furnished at a moderate expense.

Having thus described the invention, what is claimed as new, is:—

1. In a machine of the class described, a frame comprising front and rear bars and a side bar consisting of an angle bar connecting said front and rear bars at the grain side of the frame, said angle bar having apertures in the horizontal flange thereof, a shaft supported by the front and rear bars intermediate the side bar and the stubble side of the frame; and a grain platform swingingly mounted on said shaft and having a keeper on the underside thereof; in combination with a supporting member having at its upper end a hook adapted for engagement with the keeper and at its lower end a flange provided with curved hooks adapted for engagement with the apertures in the horizontal flange of the side bar; and a grain wheel carried by said supporting member.

2. In a machine of the class described, a frame including front and rear bars and a side bar connecting the same at the grain side of the frame; a shaft supported by the front and rear bars intermediate the side bar and the stubble side of the frame, a grain platform swingingly mounted on said shaft and locking means slidably mounted on the grain platform and adapted to be moved beneath the side bar to effect locking engagement between said side bar and the grain platform when the latter is in extended position.

3. In a machine of the class described, a frame including a side bar, a grain platform hingedly connected with the frame and adapted to be supported upon the side bar, a locking bar, links connected pivotally with the platform and supporting the locking bar, and a lever arm associated with one of the links to actuate the locking bar.

4. In a machine of the class described, a frame including a side bar, a platform hingedly connected with the frame and adapted to be supported upon the side bar, links pivotally connected with the platform, a locking bar supported pivotally by the links and having an arcuate hookshaped portion adapted to engage the side bar of the frame, and means for actuating the links to move the locking bar into and out of engaging position.

5. In a machine of the class described, a frame including a side bar having apertures, a grain platform hingedly connected with the frame and including a flange having apertures, a supporting member having a flange provided with upstanding hooks adapted to interchangeably engage the apertures in the side bar of the frame and in the flange of the platform, said supporting member being provided with a hook flange at its upper end, means associated with the grain platform to engage the hook flange of the supporting member, and a grain wheel adjustably associated with the supporting member.

In testimony whereof I affix my signature in presence of two witnesses.

THOMAS C. DUNCAN.

Witnesses:
  THOS. J. HILL,
  C. W. JOHNSON.

Copies of this patent may be obtained for five cents each, by addressing the "Commissioner of Patents, Washington, D. C."